United States Patent
Zhou et al.

(10) Patent No.: US 12,553,516 B1
(45) Date of Patent: Feb. 17, 2026

(54) THERMAL ABLATION-RESISTANT, WEAR-RESISTANT, AND FRICTION-REDUCING COATED PISTON RING, PREPARATION METHOD THEREOF AND ENGINE

(71) Applicant: Asimco Shuanghuan Piston Ring(yizheng) Co., Ltd., Yizheng (CN)

(72) Inventors: Yueting Zhou, Yizheng (CN); Qianxi Liu, Yizheng (CN); Jun Zhang, Yizheng (CN)

(73) Assignee: Asimco Shuanghuan Piston Ring(yizheng) Co., Ltd., Yizheng (CN)

( * ) Notice: Subject to any disclaimer, the term of this patent is extended or adjusted under 35 U.S.C. 154(b) by 0 days.

(21) Appl. No.: 19/207,463

(22) Filed: May 14, 2025

(30) Foreign Application Priority Data

Feb. 21, 2025 (CN) .......................... 202510201864.8

(51) Int. Cl.
 *F16J 9/26* (2006.01)
 *C23C 14/02* (2006.01)
 (Continued)

(52) U.S. Cl.
 CPC .............. *F16J 9/26* (2013.01); *C23C 14/025* (2013.01); *C23C 14/0611* (2013.01); *C23C 14/35* (2013.01)

(58) Field of Classification Search
 CPC ... F16J 9/26; F16J 9/28; C23C 14/025; C23C 14/0611; C23C 14/35
 See application file for complete search history.

(56) References Cited

U.S. PATENT DOCUMENTS 9,057,442 B2 * 6/2015 Lu .............................. F16J 9/26
12,203,553 B1 1/2025 Shi
(Continued)

FOREIGN PATENT DOCUMENTS

CN 101680078 A 3/2010
CN 109372651 A 2/2019
(Continued)

OTHER PUBLICATIONS

Machine translation of WO-2024063157-A1 (Year: 2025).*
Machine translation of CN-117488300-A (Year: 2025).*

*Primary Examiner* — Gilbert Y Lee
(74) *Attorney, Agent, or Firm* — Bayramoglu Law Offices LLC

(57) ABSTRACT

A thermal ablation-resistant, wear-resistant, and friction-reducing coated piston ring, a preparation method thereof and an engine are provided. An outer circumferential surface of a piston ring material matrix includes, from bottom to top, a wear-resistant and friction-reducing layer and a protective layer, and the protective layer is a single nitride layer or a multi-element nitride layer. The piston ring is arranged with the wear-resistant and friction-reducing layer and the protective layer from bottom to top. When the piston ring is installed in the engine, the high-temperature and high-pressure gas flow impacts the piston ring and contacts the protective layer on the surface of the piston ring, while the inner diamond-like carbon coating (DLC) functional layer is completely "encapsulated" and protected by the outer protective layer. The protective layer possesses higher ablation resistance compared to the DLC layer, effectively preventing phase transformation in the internal DLC layer.

20 Claims, 4 Drawing Sheets

(51) Int. Cl.
*C23C 14/06* (2006.01)
*C23C 14/35* (2006.01)

(56) References Cited

U.S. PATENT DOCUMENTS

2010/0295251 A1  11/2010  Sekiya
2016/0238133 A1   8/2016  Sato et al.
2019/0100836 A1   4/2019  Esser

FOREIGN PATENT DOCUMENTS

| CN | 117488300 A * | 2/2024 | ................ C25D 7/04 |
| EP | 3604782 B1 * | 7/2024 | ......... C23C 14/0611 |
| WO | WO-2024063157 A1 * | 3/2024 | ............. C23C 14/06 |

* cited by examiner

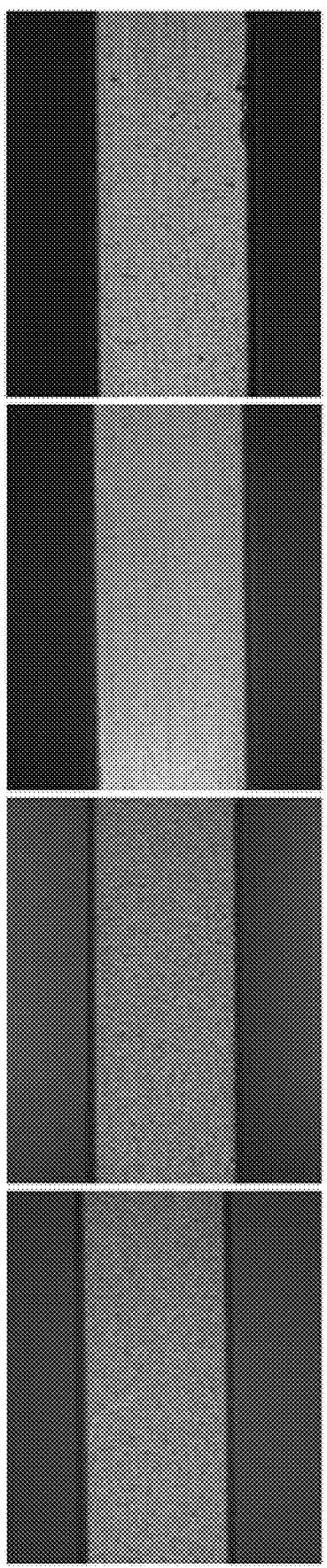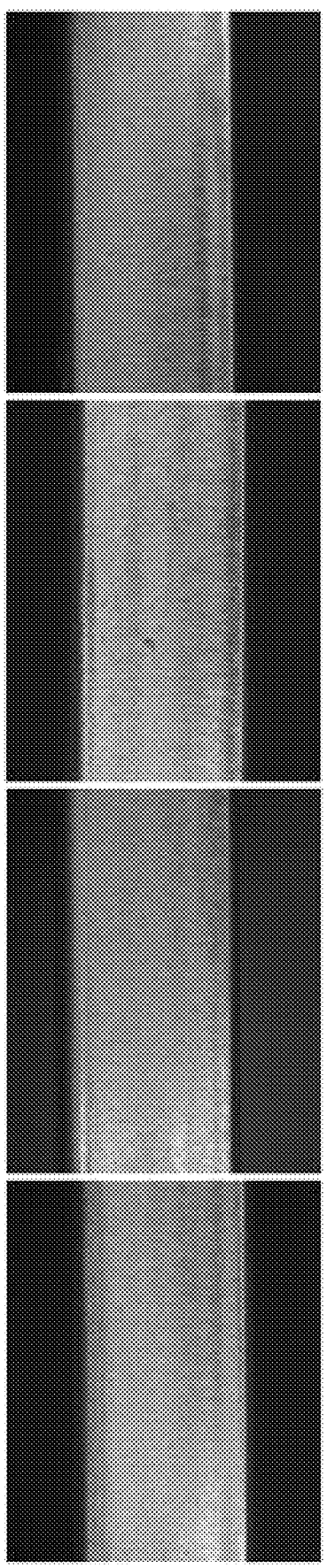

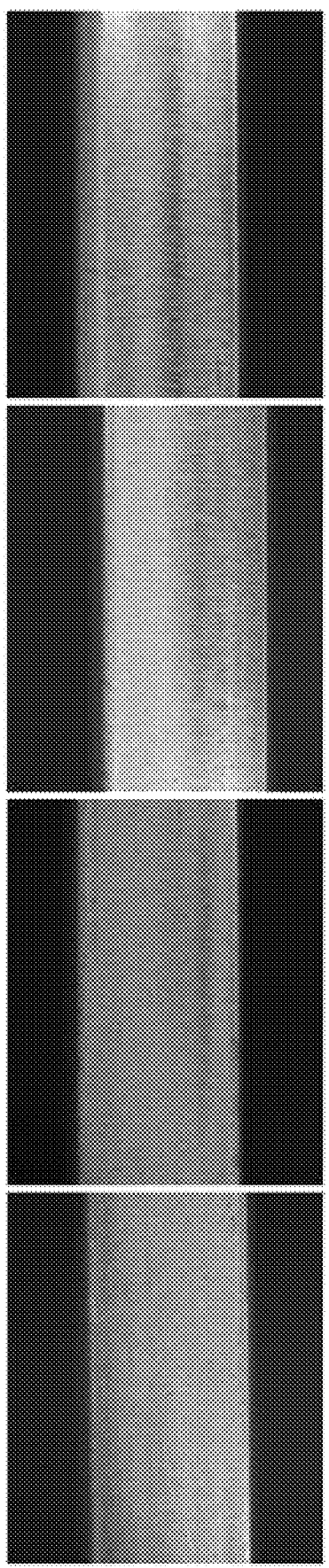
FIG. 5A
FIG. 5B
FIG. 5C
FIG. 5D
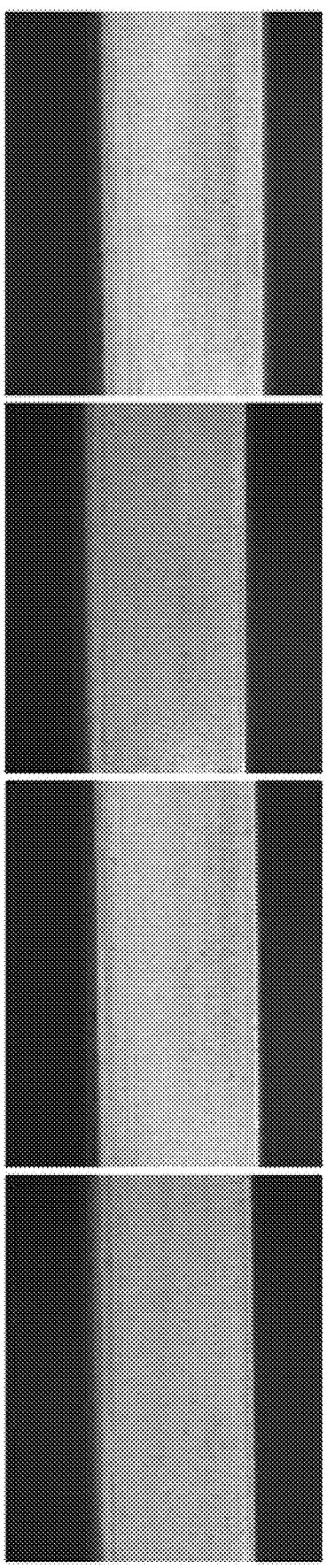
FIG. 6A
FIG. 6B
FIG. 6C
FIG. 6D

THERMAL ABLATION-RESISTANT, WEAR-RESISTANT, AND FRICTION-REDUCING COATED PISTON RING, PREPARATION METHOD THEREOF AND ENGINE

CROSS REFERENCE TO THE RELATED APPLICATIONS

This application is based upon and claims priority to Chinese Patent Application No. 202510201864.8, filed on Feb. 21, 2025, the entire contents of which are incorporated herein by reference.

TECHNICAL FIELD

The present disclosure relates to the technical field of coatings for piston rings, and in particular, to a thermal ablation-resistant, wear-resistant, and friction-reducing coated piston ring, a preparation method thereof and an engine.

BACKGROUND

As one of the critical friction pairs in an internal combustion engine, the cylinder liner-piston ring friction pair has a direct impact on the fuel economy, thermal efficiency, durability, and even the overall service life of the engine. The primary functions of a piston ring include sealing, oil control, heat transfer, and support, which directly affect the performance, operational reliability, oil consumption rate, and service life of the engine. During operation, the piston directly withstands the impact of high-temperature and high-pressure gas flow, and 60-75% of the heat absorbed by the engine piston assembly is dissipated through the ring belt region.

As internal combustion engines evolve towards higher power density, the combustion pressure, temperature, and the back pressure on the piston ring within the combustion chamber increase accordingly, resulting in more severe lubrication conditions for the cylinder liner-piston ring friction pair compared to previous designs. The piston ring operates in a high-temperature and high-pressure gas environment, where rising temperatures and deteriorating oil quality significantly reduce the original lubrication effect, thereby accelerating the wear process.

Currently, multiple technologies are available to improve the tribological performance of piston rings, with the most effective surface treatment method being the application of a diamond-like carbon (DLC) coating on the outer circumferential surface. By utilizing the high hardness and self-lubricating properties of the DLC coating, the piston ring exhibits excellent wear resistance, low friction performance, and reduced aggressiveness against the mating cylinder liner. On the other hand, the DLC coating is a metastable amorphous material containing a diamond-like structure (sp3 bond) and a graphite-like structure (sp2 bond). Carbon atoms are primarily bonded via sp3 and sp2 hybridized bonds, which are highly prone to irreversible changes (ordering) under high temperature and pressure conditions, gradually transforming from a diamond-like structure to a graphite-like structure, and the corresponding performance of the coating will be significantly reduced, or even failure. In particular, the part near the opening of the first piston ring is subjected to the highest temperature gas flow impact, as a result, the DLC coating at the opening part is prone to structural transformation under high-temperature and high-pressure gas flow impact, leading to the phenomenon of "thermal ablation".

Patent CN101680078A discloses a chromium nitride ion-plated coating applied to a piston ring of a diesel engine, the composition of which is primarily chromium, nitrogen, and carbon, and has a carbon concentration of 4-8 parts by weight relative to the sum of the concentrations of these components, the positioning and orientation of the CrN (111) plane are determined according to a texture coefficient of CrN (111) ranging from 0.4 to 0.8, with a Vickers hardness of HV1600-HV2000. Although the coating also exhibits excellent wear resistance and ablation resistance, the coating primarily suppresses the formation of coarse columnar crystal structures through the addition of carbon, thereby addressing the issue of defective spalling in chromium nitride coatings. However, it is widely recognized that the chromium nitride ion-plated coating exhibits inferior performance in terms of wear resistance and low friction properties compared to the DLC coating.

Therefore, how to achieve a coating that simultaneously possesses ablation resistance, wear resistance, and low friction properties is an urgent problem to be solved at present.

SUMMARY

An objective of the present disclosure is to provide a thermal ablation-resistant, wear-resistant, and friction-reducing coated piston ring, a preparation method thereof and an engine, to address the issue of existing coatings for piston rings being unable to simultaneously achieve both anti-ablation performance and wear-resistant, low-friction properties.

In order to achieve the above effects, the present disclosure adopts the following technical solutions.

The present disclosure provides a thermal ablation-resistant, wear-resistant, and friction-reducing coated piston ring, wherein an outer circumferential surface of a piston ring material matrix includes, from bottom to top, a wear-resistant and friction-reducing layer and a protective layer;
  the wear-resistant and friction-reducing layer is sequentially arranged from bottom to top as follows: a first adhesion layer, a second adhesion layer, a gradient diamond-like carbon (DLC) layer, and a DLC functional layer; and
  the protective layer is a single nitride layer or a multi-element nitride layer.

Preferably, a thickness of the wear-resistant and friction-reducing layer is 10 to 23 μm; and a thickness of the protective layer is 1 to 5 μm.

Preferably, the single nitride layer is a chromium nitride (CrN) layer; and the multi-element nitride layer is a Cr (Me) N layer, wherein Me is one or more of aluminum (Al), molybdenum (Mo), tungsten (W), boron (B), silicon (Si), and titanium (Ti).

Preferably, the first adhesion layer is a chromium (Cr) layer; and the second adhesion layer is a Ti layer.

The present disclosure further provides a preparation method of the thermal ablation-resistant, wear-resistant, and friction-reducing coated piston ring, including the following steps:
  (1) placing the piston ring material matrix in vacuum coating equipment, heating and evacuating a chamber of the vacuum coating equipment; then introducing argon gas, utilizing the outer cylindrical surface of piston ring material matrix as a surface to be coated, and performing ion cleaning on the outer cylindrical surface;

(2) utilizing a Cr target as a cathode, employing argon gas as a reaction gas, and depositing the first adhesion layer on the outer cylindrical surface after ion cleaning;

(3) turning off the Cr target, utilizing a Ti target as a magnetron sputtering target, employing argon gas as a reaction gas, and depositing the second adhesion layer on the first adhesion layer;

(4) turning off the Ti target, utilizing a graphite (C) target as a cathode, employing argon gas as a reaction gas, gradually increasing a negative bias voltage during the deposition process, and depositing the gradient DLC layer on the second adhesion layer;

(5) utilizing the C target as a cathode, applying a periodically alternating high/low negative bias voltage during the deposition process, and depositing the DLC functional layer on the gradient DLC layer; and (6) turning off the C target, utilizing the Cr target or a multi-element alloy target as a cathode, employing nitrogen gas as a reaction gas, and depositing the protective layer on the DLC functional layer, to obtain the thermal ablation-resistant, wear-resistant, and friction-reducing coated piston ring.

Preferably, in step (2), parameters for depositing the first adhesion layer are as follows: a vacuum level of $1\times10^{-3}$ Pa; a cathode current of 80 to 120 A; a negative bias voltage of −17 to −23 V; a gas pressure of 1 to 2 Pa; and a deposition time of 55 to 75 min; and in step (3), parameters for depositing the second adhesion layer are as follows: a vacuum level of $1\times10^{-3}$ Pa; a power of magnetron sputtering of 5 to 10 kW; a negative bias voltage of −100 to −200 V; a gas pressure of 0.2 to 2 Pa; and a deposition time of 55 to 75 min.

Preferably, in step (4), parameters for depositing the gradient DLC layer are as follows: a vacuum level of $1\times10^{-3}$ Pa; a cathode current of 80 to 180 A; a negative bias voltage being uniformly increased from −800 V to −2000 V during the deposition process; and a deposition time of 50 to 80 min.

Preferably, in step (5), parameters for depositing the DLC functional layer are as follows: a vacuum level of $1\times10^{-3}$ Pa; a cathode current of 80 to 180 A; applying a periodically alternating high/low negative bias voltage with a cycle of 2 to 3 s, wherein a high negative bias voltage is −1600 to −2500 V, and a low negative bias voltage is −600 to −1000 V; and a deposition time of 5 to 30 h.

Preferably, in step (6), parameters for depositing the protective layer are as follows: a flow rate of nitrogen gas of 35 to 45 standard cubic centimeter per minute (sccm); a cathode current of 100 to 120 A; a negative bias voltage of −20 to −25 V; and a deposition time of 30 to 120 min.

The present disclosure further provides an engine, wherein the engine incorporates the thermal ablation-resistant, wear-resistant, and friction-reducing coated piston ring, or the thermal ablation-resistant, wear-resistant, and friction-reducing coated piston ring prepared by the preparation method.

According to the above technical solutions, compared with the prior art, the present disclosure has the following beneficial effects:

The piston ring of the present disclosure is arranged with the wear-resistant and friction-reducing layer and the protective layer from bottom to top. When the piston ring is installed in the engine, the high-temperature and high-pressure gas flow impacts the piston ring and contacts the protective layer on the surface of the piston ring, while the inner DLC functional layer is completely "encapsulated" and protected by the outer protective layer. The protective layer possesses higher ablation resistance compared to the DLC layer, effectively preventing phase transformation in the internal DLC layer. The CrN used in the protective layer of the present disclosure is generally oxidized only in high-temperature environments above 600° C., and the physical properties of the CrN remain unchanged below this temperature; and the doping elements in the doped multi-element nitride improve the mechanical properties while exhibiting high temperature resistance. In the piston ring of the present disclosure, even after a period of operation, surface wear may occur; however, since the piston ring adopts a conventional asymmetric barral face design, the wear is limited to the high point of the barrel surface on the outer circumference of the piston ring. Even when the protective layer at the high point of the barrel surface is worn or penetrated (as shown in FIG. 2), the protective layer at the non-high points (the upper and lower barrel surfaces on the outer circumference of the piston ring) remains capable of resisting the impact of high-temperature and high-pressure gas flow, thereby effectively safeguarding the internal DLC functional layer and avoiding "ablation" of the wear-resistant and friction-reducing DLC coating.

BRIEF DESCRIPTION OF THE DRAWINGS

In order to more clearly illustrate the examples of the present disclosure or technical solutions in the prior art, the accompanying drawings used in the description of the examples or the prior art will now be described briefly.

FIGS. 3A-3D show morphologies of a thermal ablation-resistant, wear-resistant, and friction-reducing coated piston ring in Comparative Example 1 before and after a heat resistance performance test, wherein a shows a morphology before the test; b shows a morphology after the test at 300° C.; c shows a morphology after the test at 350° C.; and d shows a morphology after the test at 400° C.;

FIGS. 4A-4D show morphologies of a thermal ablation-resistant, wear-resistant, and friction-reducing coated piston ring in Example 1 before and after a heat resistance performance test, wherein a shows a morphology before the test; b shows a morphology after the test at 300° C.; c shows a morphology after the test at 350° C.; and d shows a morphology after the test at 400° C.;

FIGS. 5A-5D show morphologies of a thermal ablation-resistant, wear-resistant, and friction-reducing coated piston ring in Example 2 before and after a heat resistance performance test, wherein a shows a morphology before the test; b shows a morphology after the test at 300° C.; c shows a morphology after the test at 350° C.; and d shows a morphology after the test at 400° C.; and FIGS. 6A-6D show morphologies of a thermal ablation-resistant, wear-resistant, and friction-reducing coated piston ring in Example 3 before and after a heat resistance performance test, wherein a shows a morphology before the test; b shows a morphology after the test at 300° C.; c shows a morphology after the test at 350° C.; and d shows a morphology after the test at 400° C.

DETAILED DESCRIPTION OF THE EMBODIMENTS

Figure 1:
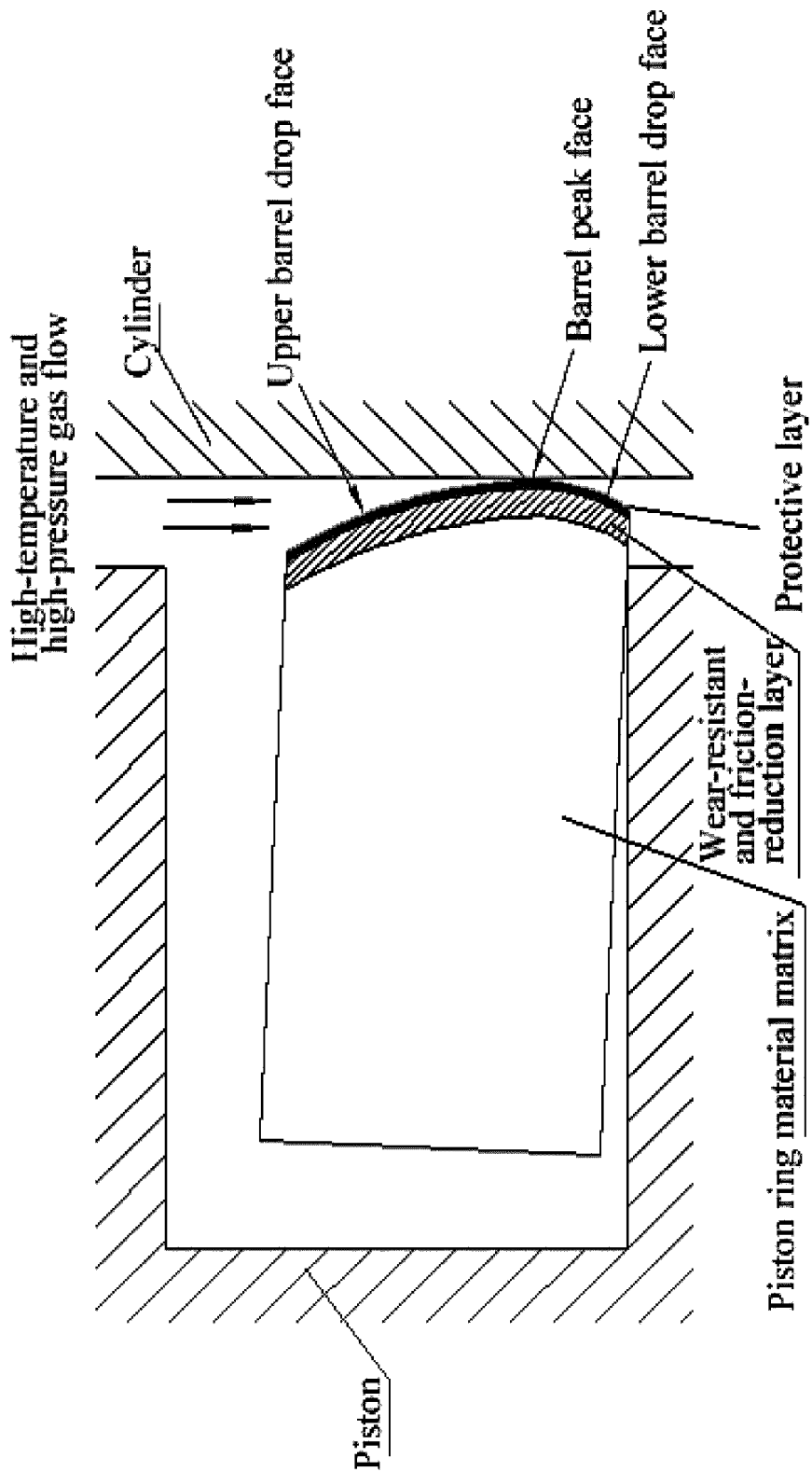
FIG. 1 is a cross-sectional view of a thermal ablation-resistant, wear-resistant, and friction-reducing coated piston ring of the present disclosure.
Figure 2:
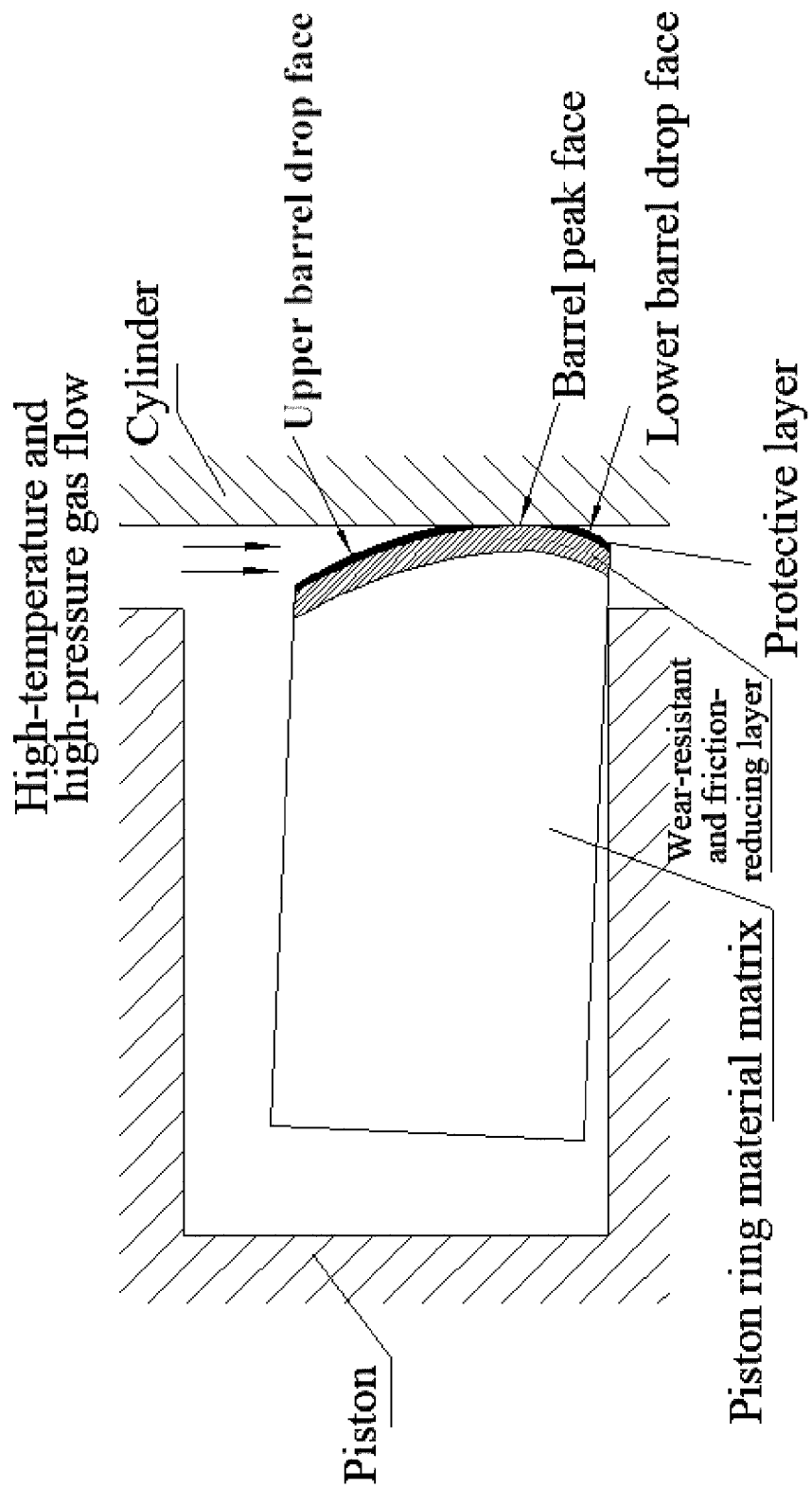
FIG. 2 is a cross-sectional view of a thermal ablation-resistant, wear-resistant, and friction-reducing coated piston ring of the present disclosure after wear occurs.

The present disclosure provides a thermal ablation-resistant, wear-resistant, and friction-reducing coated piston ring, a cross-sectional view of which is shown in FIG. 1, and an outer circumferential surface of a piston ring material matrix includes, from bottom to top, a wear-resistant and friction-reducing layer and a protective layer;

the wear-resistant and friction-reducing layer is sequentially arranged from bottom to top as follows: a first adhesion layer, a second adhesion layer, a gradient diamond-like carbon (DLC) layer, and a DLC functional layer; and the protective layer is a single nitride layer or a multi-element nitride layer.

In the present disclosure, a thickness of the wear-resistant and friction-reducing layer is preferably 10 to 23 μm, further preferably 15 to 22 μm, and more preferably 20 μm.

In the present disclosure, a thickness of the protective layer is preferably 1 to 5 μm, further preferably 2.5 to 4 μm, and more preferably 3 μm.

In the present disclosure, the single nitride layer is preferably a CrN layer; and the multi-element nitride layer is preferably a Cr(Me)N layer, wherein Me is preferably one or more of Al, Mo, W, B, Si, and Ti, further preferably one or more of Al, Mo, and Ti, and more preferably Mo.

In the present disclosure, the first adhesion layer is preferably a Cr layer; and the second adhesion layer is preferably a Ti layer.

In the present disclosure, the DLC functional layer is alternately arranged with a low-hardness DLC layer and a high-hardness DLC layer; and the low-hardness DLC layer is adjacent to the gradient DLC layer.

In the present disclosure, the material of the piston ring material matrix is preferably stainless steel.

The present disclosure further provides a preparation method of the thermal ablation-resistant, wear-resistant, and friction-reducing coated piston ring, including the following steps:

(1) the piston ring material matrix is placed in vacuum coating equipment, and a chamber of the vacuum coating equipment is heated and evacuated; then argon gas is introduced, the outer circumferential surface of the piston ring material matrix is utilized as a surface to be coated, and ion cleaning is performed on the outer circumferential surface;

(2) a Cr target is utilized as a cathode, argon gas is employed as a reaction gas, and the first adhesion layer is deposited on the outer circumferential surface after the ion cleaning;

(3) the Cr target is turned off, a Ti target is utilized as a magnetron sputtering target, argon gas is employed as a reaction gas, and the second adhesion layer is deposited on the first adhesion layer;

(4) the Ti target is turned off, a C target is utilized as a cathode, argon gas is employed as a reaction gas, a negative bias voltage is gradually increased during the deposition process, and the gradient DLC layer is deposited on the second adhesion layer;

(5) the C target is utilized as a cathode, a periodically alternating high/low negative bias voltage is applied during the deposition process, and the DLC functional layer is deposited on the gradient DLC layer; and (6) the C target is turned off, the Cr target or a multi-element alloy target is utilized as a cathode, nitrogen gas is employed as a reaction gas, and the protective layer is deposited on the DLC functional layer, to obtain the thermal ablation-resistant, wear-resistant, and friction-reducing coated piston ring.

In the present disclosure, before use, the piston ring material matrix further includes pretreatment; the pretreatment is ultrasonic cleaning to remove impurities such as oil, grease, and dirt from the surface of the piston ring material matrix. The present disclosure does not limit the conditions for ultrasonic cleaning, and conventional methods known in the art may be employed.

In the present disclosure, the vacuum coating equipment in step (1) is a conventional device in the art, providing vacuum arc ion plating deposition function and magnetron sputtering deposition function, and no specific limitations are imposed by the present disclosure.

In the present disclosure, in step (1), a heating temperature is preferably 100 to 150° C., further preferably 130 to 150° C., and more preferably 150° C.

In the present disclosure, in step (1), a vacuum level for evacuation is preferably $5\times10^{-3}$ Pa.

In the present disclosure, in step (1), parameters for the ion cleaning are as follows: a negative bias voltage is preferably −800 to −1200 V, further preferably −900 to −1100 V, and more preferably −1000 V; a time for the ion cleaning time is preferably 90 to 120 min, further preferably 95 to 110 min, and more preferably 110 min.

In the present disclosure, in step (2), parameters for depositing the first adhesion layer are as follows: a vacuum level is preferably $1\times10^{-3}$ Pa; a cathode current is preferably 80 to 120 A, further preferably 90 to 115 A, and more preferably 100 A; a negative bias voltage is preferably −17 to −23 V, further preferably −19 to −22 V, and more preferably −21 V; a gas pressure is preferably 1 to 2 Pa, further preferably 1 to 1.7 Pa, and more preferably 1 Pa; and a deposition time is preferably 55 to 75 min, further preferably 60 to 72 min, and more preferably 65 min.

In the present disclosure, in step (3), parameters for depositing the second adhesion layer are as follows: a vacuum level is preferably $1\times10^{-3}$ Pa; a power of magnetron sputtering is preferably 5 to 10 KW, further preferably 6 to 9 KW, and more preferably 8 kW; a negative bias voltage is preferably −100 to −200 V, further preferably −150 to −200 V, and more preferably −200 V; a gas pressure is preferably 0.2 to 2 Pa, further preferably 0.6 to 1.5 Pa, and more preferably 1 Pa; and a deposition time is preferably 55 to 75 min, further preferably 58 to 72 min, and more preferably 60 min.

In the present disclosure, in step (4), parameters for depositing the gradient DLC layer are as follows: a vacuum level is preferably $1\times10^{-3}$ Pa; a cathode current is preferably 80 to 180 A, further preferably 85 to 140 A, and more preferably 130 A; a negative bias voltage is preferably increased uniformly from −800 V to −2000 V during the deposition process; and a deposition time is preferably 50 to 80 min, further preferably 55~70 min, and more preferably 60 min.

In the present disclosure, in step (5), parameters for depositing the DLC functional layer are as follows: a vacuum level is preferably $1\times10^{-3}$ Pa; a cathode current is preferably 80 to 180 A, further preferably 100 to 170 A, and more preferably 145 A; a cycle is preferably 2 to 3 s, more preferably 2 s; a high negative bias voltage in the high/low negative bias voltage is preferably −1600 to −2500 V, further preferably −1800 to −2200 V, and more preferably −2100 V;

a low negative bias voltage in the high/low negative bias voltage is preferably −600 to −1000 V, further preferably −650 to −900 V, and more preferably −800 V; and a deposition time is preferably 5 to 30 h, further preferably 10 to 20 h, and more preferably 17 h.

Preferably, in step (6), parameters for depositing the protective layer are as follows: a flow rate of nitrogen gas is preferably 35 to 45 sccm, further preferably 37 to 42 sccm, and more preferably 40 sccm; a cathode current is preferably 100 to 120 A, further preferably 100 to 110 A, and more preferably 100 A; a negative bias voltage of −20 to −25 V, further preferably −21 to −24 V, and more preferably −22 V; and a deposition time is preferably 30 to 120 min, further preferably 40 to 60 min, and more preferably 45 min.

The present disclosure further provides an engine, wherein the engine incorporates the thermal ablation-resistant, wear-resistant, and friction-reducing coated piston ring, or the thermal ablation-resistant, wear-resistant, and friction-reducing coated piston ring prepared by the preparation method.

In the following, the technical solutions in the examples of the present disclosure will be clearly and completely described with reference to the drawings in the examples of the present disclosure. Obviously, the described examples are only a part of the examples of the present disclosure, but not all the examples thereof. Based on the examples of the present disclosure, all other examples obtained by those skilled in the art without any creative efforts shall fall within the scope of the present disclosure.

EXAMPLE 1

The present example provides a thermal ablation-resistant, wear-resistant, and friction-reducing coated piston ring, wherein an outer circumferential surface of a piston ring material matrix includes, from bottom to top, a 20 μm wear-resistant and friction-reducing layer and a 2.5 μm CrN layer; and
  the wear-resistant and friction-reducing layer includes, from bottom to top in sequence, a Cr layer, a Ti layer, a gradient DLC layer, and a DLC functional layer.

A preparation method of the thermal ablation-resistant, wear-resistant, and friction-reducing coated piston ring includes the following steps:
  (1) the piston ring material matrix, after being ultrasonically cleaned and dried, was placed in vacuum coating equipment, and a chamber of the vacuum coating equipment was heated and evacuated; when a temperature reached 150° C. and a vacuum level reached $5 \times 10^{-3}$ Pa, argon gas with a purity of 99.99% was introduced, and the outer circumferential surface of the piston ring material matrix was utilized as a surface to be coated, an applied negative bias voltage was −1000 V, and ion cleaning was performed on the outer circumferential surface for 110 min;
  (2) when the vacuum level was reduced to $1 \times 10^{-3}$ Pa, a Cr target was utilized as a cathode, argon gas was employed as a reaction gas, a cathode current was 100 A, a gas pressure was 1 Pa, the negative bias voltage was-20 V, and the Cr layer was deposited on the outer circumferential surface after the ion cleaning, with a deposition time of 65 min;
  (3) the Cr target was turned off, after the vacuum level was reduced to $1 \times 10^{-3}$ Pa, a Ti target was utilized as a magnetron sputtering target, argon gas was employed as the reaction gas, a sputtering power was set to 8 kW, the gas pressure was set to 1 Pa, and the applied negative bias voltage was −200 V, and the Ti layer was deposited on the Cr layer, with a deposition time of 60 min;
  (4) the Ti target was turned off, after the vacuum level was reduced to $1 \times 10^{-3}$ Pa, a C target was utilized as the cathode, the cathode current was 130 A, the negative bias voltage was uniformly increased from −800 V to −2000 V within 60 min, and the gradient DLC layer was deposited on the Ti layer, with a deposition time of 60 min;
  (5) after the vacuum level was reduced to $1 \times 10^{-3}$ Pa, the C target was utilized as the cathode, the cathode current was 145 A, during the deposition process, a high/low negative bias voltage alternating at a cycle of 2 s was applied, wherein a high negative bias voltage was −2100 V, and a low negative bias voltage was −800 V, and the DLC functional layer was deposited on the gradient DLC layer, with a deposition time of 17 h; and
  (6) the C target was turned off, and the Cr target was utilized as the cathode, nitrogen gas was employed as a reaction gas, with a flow rate of 40 sccm, the cathode current was 100 A, the negative bias voltage was −22 V, and the CrN layer was deposited on the DLC functional layer, with a deposition time of 45 min, thereby obtaining the thermal ablation-resistant, wear-resistant, and friction-reducing coated piston ring.

EXAMPLE 2

The present example provides a thermal ablation-resistant, wear-resistant, and friction-reducing coated piston ring, wherein an outer circumferential surface of a piston ring material matrix includes, from bottom to top, a 20 μm wear-resistant and friction-reducing layer and a 3 μm CrAlN layer; and
  the wear-resistant and friction-reducing layer includes, from bottom to top in sequence, a Cr layer, a Ti layer, a gradient DLC layer, and a DLC functional layer.

A preparation method of the thermal ablation-resistant, wear-resistant, and friction-reducing coated piston ring was specifically described in Example 1, with the difference that in step (6), a CrAl target was utilized as the cathode, with the flow rate of nitrogen gas of 35 sccm, the cathode current of 100 A, the negative bias voltage of −25 V, and the deposition time of 58 min.

EXAMPLE 3

The present example provides a thermal ablation-resistant, wear-resistant, and friction-reducing coated piston ring, wherein an outer circumferential surface of a piston ring material matrix includes, from bottom to top, a 20 μm wear-resistant and friction-reducing layer and a 3 μm CrMoN layer; and
  the wear-resistant and friction-reducing layer includes, from bottom to top in sequence, a Cr layer, a Ti layer, a gradient DLC layer, and a DLC functional layer; and
  A preparation method of the thermal ablation-resistant, wear-resistant, and friction-reducing coated piston ring was specifically described in Example 1, with the difference that in step (6), a CrMo target was utilized as the cathode, with the flow rate of nitrogen gas of 45 sccm, the cathode current of 120 A, the negative bias voltage of −20 V, and the deposition time of 55 min.

COMPARATIVE EXAMPLE 1

The present comparative example provides a thermal ablation-resistant, wear-resistant, and friction-reducing coated piston ring, wherein an outer circumferential surface of a piston ring material matrix includes, from bottom to top, a 23 μm wear-resistant and friction-reducing layer. A preparation method of the thermal ablation-resistant, wear-resistant, and friction-reducing coated piston ring was specifically described in Example 2, with the difference that, in step (5), the deposition time was 19.5 h, and step (6) was not performed.

The piston rings prepared in Examples 1-3 and Comparative Example 1 were subjected to a heat resistance performance test, and the specific method was as follows:

The piston ring was placed in a muffle furnace, being heated to a temperature T and held at that temperature for 24 h, afterward, the piston ring was removed from the muffle furnace, and air-cooled to room temperature, then the coating integrity was observed, and the appearance was compared with that before the test to identify any differences. Morphologies and appearance before and after the test are shown in FIGS. 3A-6D, and the evaluation of post-test morphology results is shown in Table 1.

TABLE 1

Evaluation of the morphology results after heat resistance performance test

| Sample | Post-test morphology results | | | Performance evaluation |
| --- | --- | --- | --- | --- |
| | T = 300° C. | T = 350° C. | T = 400° C. | |
| Comparative Example 1 | Coating intact, no spalling, no significant color difference | Coating intact, no spalling, significant color difference | Local edge spalling, dull appearance. | Fair |
| Example 1 | Coating intact, no peeling, no significant color difference | Coating intact, no peeling, no significant color difference | Coating intact, no peeling, no significant color difference | Excellent |
| Example 2 | Coating is intact, with no peeling, no significant color difference | Coating intact, no peeling, no significant color difference | Coating intact, no peeling, no significant color difference | Excellent |
| Example 3 | Coating intact, with no peeling, no significant color difference | Coating intact, no peeling, no significant color difference | Coating intact, no peeling, no significant color difference | Excellent |

According to Table 1 and FIGS. 3A-6D, it can be seen that the coating of the piston ring with a protective layer of the present disclosure may maintain the integrity of the coating after undergoing a heat resistance performance test at 300° C. and even 400° C., without peeling or significant color difference, which indicates that the coating of the present disclosure exhibits excellent anti-ablation properties. Furthermore, the protective layer is continuously deposited in the same device after the completion of the DLC functional layer deposition, ensuring a strong bond between the protective layer and the DLC wear-resistant and friction-reducing coating. In contrast, the coating of Comparative Example 1 shows spalling at the edges after undergoing the heat resistance performance test at 400° C. (as shown in FIG. 3D), indicating that the absence of a protective layer significantly deteriorates the anti-ablation performance.

The above descriptions are merely preferred examples of the present disclosure. It should be noted that, for those of ordinary skill in the art, various modifications and refinements may be made without departing from the principles of the present disclosure, and these modifications and refinements shall also be regarded as falling within the protection scope of the present disclosure.

What is claimed is:

1. A thermal ablation-resistant, wear-resistant, and friction-reducing coated piston ring, wherein an outer circumferential surface of a piston ring material matrix comprises, from bottom to top, a wear-resistant and friction-reducing layer and a protective layer;

the wear-resistant and friction-reducing layer is sequentially arranged radially outward from the outer circumferential surface of the piston ring as follows: a first adhesion layer, a second adhesion layer, a gradient diamond-like carbon (DLC) layer, and a DLC functional layer; and the protective layer is a single nitride layer or a multi-element nitride layer.

2. The thermal ablation-resistant, wear-resistant, and friction-reducing coated piston ring according to claim 1, wherein a thickness of the wear-resistant and friction-reducing layer is 10 to 23 μm; and a thickness of the protective layer is 1 to 5 μm.

3. The thermal ablation-resistant, wear-resistant, and friction-reducing coated piston ring according to claim 2, wherein the single nitride layer is a chromium nitride (CrN) layer.

4. The thermal ablation-resistant, wear-resistant, and friction-reducing coated piston ring according to claim 3, wherein the first adhesion layer is a Cr layer; and the second adhesion layer is a Ti layer.

5. The thermal ablation-resistant, wear-resistant, and friction-reducing coated piston ring according to claim 1, wherein the first adhesion layer is a chromium (Cr) layer; and the second adhesion layer is a Ti layer.

6. A preparation method of the thermal ablation-resistant, wear-resistant, and friction-reducing coated piston ring according to claim 1, comprising the following steps:

1) placing the piston ring material matrix in a vacuum coating equipment, and heating and evacuating a chamber of the vacuum coating equipment; and introducing argon gas, utilizing the outer circumferential surface of the piston ring material matrix as a surface to be coated, and performing ion cleaning on the outer circumferential surface;

2) utilizing a Cr target as a cathode, employing the argon gas as a reaction gas, and depositing the first adhesion layer on the outer circumferential surface after the ion cleaning;

3) turning off the Cr target, utilizing a Ti target as a magnetron sputtering target, employing the argon gas as a reaction gas, and depositing the second adhesion layer on the first adhesion layer;

4) turning off the Ti target, utilizing a graphite (C) target as a cathode, employing the argon gas as a reaction gas, gradually increasing a negative bias voltage during a deposition process, and depositing the gradient DLC layer on the second adhesion layer;

5) Utilizing the C target as a cathode, applying a periodically alternating high/low negative bias voltage during a deposition process, and depositing the DLC functional layer on the gradient DLC layer; and 6) Turning off the C target, utilizing the Cr target or a multi-element alloy target as a cathode, employing nitrogen gas as a reaction gas, and depositing the protective layer on the DLC functional layer, to obtain the thermal ablation-resistant, wear-resistant, and friction-reducing coated piston ring.

7. The preparation method according to claim 6, wherein in the step 2), parameters for depositing the first adhesion layer are as follows: a vacuum level of $1 \times 10^{-3}$ Pa; a cathode current of 80 to 120 A; a negative bias voltage of −17 to −23 V; a gas pressure of 1 to 2 Pa; and a deposition time of 55 to 75 min; and wherein in the step 3), parameters for depositing the second adhesion layer are as follows: a vacuum level of $1 \times 10^{-3}$ Pa; a power of magnetron sputtering of 5 to 10 kW; a negative bias voltage of −100 to −200 V; a gas pressure of 0.2 to 2 Pa; and a deposition time of 55 to 75 min.

8. The preparation method according to claim 7, wherein in the step 4), parameters for depositing the gradient DLC layer are as follows: a vacuum level of $1 \times 10^{-3}$ Pa; a cathode current of 80 to 180 A; the negative bias voltage being uniformly increased from −800 V to −2000 V during the deposition process; and a deposition time of 50 to 80 min.

9. The preparation method according to claim 8, wherein in the step 5), parameters for depositing the DLC functional layer are as follows: a vacuum level of $1 \times 10^{-3}$ Pa; a cathode current of 80 to 180 A; applying the periodically alternating high/low negative bias voltage with a cycle of 2 to 3 s, wherein a high negative bias voltage is −1600 to −2500 V, and a low negative bias voltage is −600 to −1000 V; and a deposition time of 5 to 30 h.

10. The preparation method according to claim 6, wherein in the step 5), parameters for depositing the DLC functional layer are as follows: a vacuum level of $1 \times 10^{-3}$ Pa; a cathode current of 80 to 180 A; applying the periodically alternating high/low negative bias voltage with a cycle of 2 to 3 s, wherein a high negative bias voltage is −1600 to −2500 V, and a low negative bias voltage is −600 to −1000 V; and a deposition time of 5 to 30 h.

11. The preparation method according to claim 10, wherein in the step 6), parameters for depositing the protective layer are as follows: a flow rate of the nitrogen gas of 35 to 45 standard cubic centimeter per minute (sccm); a cathode current of 100 to 120 A; a negative bias voltage of −20 to −25 V; and a deposition time of 30 to 120 min.

12. The preparation method according to claim 6, wherein in the thermal ablation-resistant, wear-resistant, and friction-reducing coated piston ring, a thickness of the wear-resistant and friction-reducing layer is 10 to 23 μm; and a thickness of the protective layer is 1 to 5 μm.

13. The preparation method according to claim 12, wherein in the thermal ablation-resistant, wear-resistant, and friction-reducing coated piston ring, the single nitride layer is a CrN layer; and the multi-element nitride layer is a Cr(Me)N layer, wherein Me is one or more of Al, Mo, W, B, Si, and Ti.

14. The preparation method according to claim 6, wherein in the thermal ablation-resistant, wear-resistant, and friction-reducing coated piston ring, the first adhesion layer is a Cr layer; and the second adhesion layer is a Ti layer.

15. An engine, wherein the engine incorporates the thermal ablation-resistant, wear-resistant, and friction-reducing coated piston ring according to claim 1.

16. The engine according to claim 15, wherein in the thermal ablation-resistant, wear-resistant, and friction-reducing coated piston ring, a thickness of the wear-resistant and friction-reducing layer is 10 to 23 μm; and a thickness of the protective layer is 1 to 5 μm.

17. The engine according to claim 16, wherein in the thermal ablation-resistant, wear-resistant, and friction-reducing coated piston ring, the single nitride layer is a CrN layer; and the multi-element nitride layer is a Cr(Me)N layer, wherein Me is one or more of Al, Mo, W, B, Si, and Ti.

18. The engine according to claim 15, wherein in the thermal ablation-resistant, wear-resistant, and friction-reducing coated piston ring, the first adhesion layer is a Cr layer; and the second adhesion layer is a Ti layer.

19. An engine, wherein the engine incorporates the ablation-resistant, wear-resistant, and friction-reducing coated piston ring prepared by the preparation method according to claim 6.

20. The engine according to claim 19, wherein in the step 2) of the preparation method, parameters for depositing the first adhesion layer are as follows: a vacuum level of $1 \times 10^{-3}$ Pa; a cathode current of 80 to 120 A; a negative bias voltage of −17 to −23 V; a gas pressure of 1 to 2 Pa; and a deposition time of 55 to 75 min; and wherein in the step 3), parameters for depositing the second adhesion layer are as follows: a vacuum level of $1 \times 10^{-3}$ Pa; a power of magnetron sputtering of 5 to 10 kW; a negative bias voltage of −100 to −200 V; a gas pressure of 0.2 to 2 Pa; and a deposition time of 55 to 75 min.

* * * * *